United States Patent Office 2,833,757
Patented May 6, 1958

2,833,757

N-CYANOALKYL HEXITYL AMINES

John D. Zech, Wilmington, Del., assignor to Atlas Powder Company, Wilmington, Del., a corporation of Delaware No Drawing. Application October 12, 1953
Serial No. 385,717

10 Claims. (Cl. 260—211)

The present invention relates to a new class of chemical compounds. More particularly it relates to N-cyanoalkyl hexityl amines.

It is an object of the present invention to provide a new class of compounds that are N-cyanoalkyl hexityl amines. It is another object of the present invention to provide methods for the manufacture of said N-cyanoalkyl hexityl amines. These and many other objects and advantages will become apparent to those skilled in the art from the following discussion and disclosure.

The compounds of the present invention may be represented by the following generic formula:

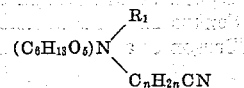

wherein ($C_6H_{13}O_5$) represents the hexane pentol residue of a hexityl amine.

$n$ is 1 to 3.

$R_1$ is selected from the group consisting of hydrogen, alkyl radicals containing 1 to 20 carbon atoms, hydroxy alkyl radicals containing 1 to 10 carbon atoms, aryl radicals, aralkyl radicals, cycloalkyl radicals, and cyanoalkyl radicals containing 1 to 4 carbon atoms. The preferred class of compounds are those wherein $R_1$ is an alkyl radical. When $R_1$ is alkyl, those alkyl radicals are preferred containing 1 to 3 carbon atoms. When $R_1$ is hydroxy alkyl, the hydroxy alkyl radicals are preferred containing 1 to 3 carbon atoms.

The compounds of the present invention are useful as chemical intermediates, particularly for the synthesis of N-carboxyalkyl hexityl amines as taught in copending application, Serial No. 379,306, filed September 9, 1953, and diamines. These diamines may be readily formed by the catalytic reduction of the cyanoalkyl hexityl amines. A hexityl amine is an amino derivative of a hexitol such as sorbitol, mannitol, dulcitol, etc., wherein any one of the hydroxy groups has been replaced by an amino group. Such hexityl amines are conveniently prepared by the catalytic reduction of a suitable hexose in the presence of ammonia, primary or secondary amines. For the purpose of the present invention, only primary and secondary hexityl amines are utilized. Suitable such hexityl amines include, but are not limited to, glucamine; N-methyl, N-ethyl, N-propyl, N-octyl, N-octadecyl, N-cetyl, N-hexyl, N-cyclohexyl, N-hydroxyethyl, N-hydroxypropyl, N-dihydroxypropyl, N-benzyl, glucamine; fructamine; N-ethyl, N-propyl, etc. fructamine; etc.

The compounds of the present invention are conveniently prepared by the condensation of a suitable primary or secondary hexityl amine with a cyanoalkylating agent. A cyanoalkylating agent is one capable of introducing a cyanoalkyl radical into the hexityl amine by reaction with or the removal of an amino hydrogen. Such compounds as hydroxy nitriles, unsaturated nitriles, halogen substituted nitriles, etc. are cyanoalkylating agents. For the purposes of the present invention the term hydroxy nitrile is meant to cover only those compounds wherein the hydroxyl group and the nitrile group are attached to the same carbon atoms. This is an accepted meaning for the term, but the term is sometimes used in a more generic sense to cover compounds possessing both a hydroxy group and a nitrile group, regardless of where they are located in the compound. Suitable such hydroxy nitriles include, but are not limited to such as: glycolonitrile, lactonitrile, α hydroxybutyronitrile. For the purposes of the present invention, only those unsaturated nitriles are acceptable wherein the double bond is conjugated with respect to the nitrile group. Suitable unsaturated nitriles include, but are not limited to, such as acrylonitrile, methacrylonitrile, crotononitrile, etc.

There are several methods of preparing the compounds of the present method. One method of preparing the compounds of the present invention comprises condensing a hydroxy nitrile with a suitable primary or secondary hexityl amine in a suitable solvent at temperatures ranging from 0 to 105° C. The preferred temperature range is from 25 to 90° C. After the reaction has run to completion the water of reaction and the solvent are distilled off, preferably under vacuum. An alternative, and closely allied method, comprises forming the hydroxy nitrile "in situ" from a suitable aldehyde or ketone, HCN and alkali cyanide and then reacting with a suitable hexityl amine in the aforementioned fashion. However, in this latter method a byproduct salt is formed which may be undesirable and difficult to separate from the N-cyanoalkyl hexityl amine.

A second method of preparing the compounds of the present invention comprises reacting a suitable hexityl amine with an unsaturated nitrile as a cyanoalkylating agent. This reaction usually progresses very readily at temperatures ranging from 25 to 75° C. In many cases no catalyst will be required. In other cases, conventional acidic or basic catalysts will improve reaction rates. In many cases it will be convenient to carry out the reaction in the presence of a mutual inert solvent such as methanol, ethanol, pyridine, etc. Solvents are particularly useful in those cases wherein the unsaturated nitrile is immiscible with the hexityl amine used or wherein the hexityl amine has a high melting point, which is above the temperature of the preferred reaction range.

The compounds of the present invention may also be prepared by reacting a suitable hexityl amine with a cyanoalkylating agent such as a halogen substituted nitrile such as chloroacetonitrile, chloropropiononitrile, bromopropiononitrile, etc. in the presence of an equivalent amount of alkali. The preferred temperature range here is from 50° to 120° C. and for the same reasons as outlined above, a mutual inert solvent, or diluent, is many times desired in view of the incompatibility of the reactants.

The following examples are given by way of illustration and are not intended to limit the scope of the present invention in any way.

*Example 1*

To a mixture of 195 g. methyl glucamine, 250 cc. of methanol and 25 cc. of water was added 81.5 g. of a 70% solution of glycolonitrile at 36–38° C. during 18 minutes. The reaction mixture was stirred at 33–39° C. for another 80 minutes, then heated to 64° C. during another 2 hours and held at 58–64° C. for 70 minutes after which the solvent and water was distilled off under vacuum leaving the product N-methyl N-cyanomethyl glucamine as a residue. It crystallized slowly on standing. The product (236.5 g.) when recrystallized from methanol had a melting point of 95–96° C. It had a hydroxyl number of 1206.

Example II

To a mixture of 195 g. methyl glucamine and 300 cc. of methanol was added 71 g. of lactonitrile at 48–59° C. during 12 minutes during which time the methyl glucamine dissolved. The mixture was heated to reflux (69° C.) and refluxed for 3 hours. The solvent was distilled off under vacuum to 93° C. leaving the product (240 g.), N-methyl N-alphacyanoethyl glucamine, as a light yellow resinous residue.

Example III

To a mixture of 195 g. methyl glucamine and 500 cc. of methanol was added 70 cc. of acrylonitrile at 23–46° C. during 100 minutes. The reaction mixture was stirred at 37–43° C. for another 4 hours and 20 minutes. After standing overnight the solvent was distilled off, finally under vacuum leaving the product (240 g.) as a pale yellow resinous residue which had a hydroxyl number of 1099 and an alkalinity of 235 mg./KOH per gram.

What is claimed is:

1. A compound of the formula:

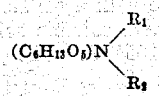

wherein $R_1$ is selected from the group consisting of hydrogen, alkyl containing 1 to 20 carbon atoms, hydroxyalkyl containing 1 to 10 carbon atoms, aryl, aralkyl, cycloalkyl and cyanoalkyl containing 1 to 4 carbon atoms; $R_2$ is a cyanoalkyl radical containing 1 to 4 carbon atoms; $(C_6H_{13}O_5)$ represents the hexane pentol residue of a hexityl amine.

2. A compound of the formula:

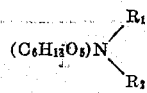

wherein $R_1$ is an alkyl radical containing 1 to 20 carbon atoms; $R_2$ is a cyanoalkyl radical containing 1 to 4 carbon atoms; $(C_6H_{13}O_5)$ represents the hexane pentol residue of a hexityl amine.

3. The product of claim 2 wherein $R_1$ is an alkyl group containing 1 to 3 carbon atoms.

4. The product of claim 1 wherein $R_1$ is an hydroxy alkyl group containing 1 to 3 carbon atoms.

5. A compound of the formula:

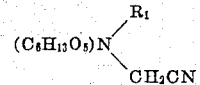

wherein $(C_6H_{13}O_5)$ represents the hexane pentol residue of a hexityl amine, and $R_1$ is an alkyl radical containing 1 to 3 carbon atoms.

6. N-methyl N-cyanomethyl glucamine.
7. N-methyl N-alpha cyanoethyl glucamine.
8. N-methyl N-beta cyanoethyl glucamine.
9. N-ethyl N-cyanomethyl glucamine.
10. N,N-bis-cyanomethyl glucamine.

References Cited in the file of this patent

UNITED STATES PATENTS

| | | |
|---|---|---|
| 2,016,956 | Calcott et al. | Oct. 8, 1935 |
| 2,401,196 | Senkus | May 28, 1946 |
| 2,712,015 | Bruson et al. | June 28, 1955 |